(12) United States Patent
Chiu

(10) Patent No.: US 10,509,566 B2
(45) Date of Patent: Dec. 17, 2019

(54) DATA STORAGE DEVICE AND OPERATING METHOD OF DATA STORAGE DEVICE

(71) Applicant: Silicon Motion, Inc., Jhubei, Hsinchu County (TW)

(72) Inventor: Shen-Ting Chiu, Houlong Township, Miaoli County (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 42 days.

(21) Appl. No.: 15/863,892

(22) Filed: Jan. 6, 2018

(65) Prior Publication Data

US 2018/0217760 A1 Aug. 2, 2018

Related U.S. Application Data

(60) Provisional application No. 62/453,565, filed on Feb. 2, 2017.

(30) Foreign Application Priority Data

Jun. 29, 2017 (TW) .............................. 106121760 A

(51) Int. Cl.
*G06F 3/06* (2006.01)
*G06F 13/38* (2006.01)

(52) U.S. Cl.
CPC ............ *G06F 3/0607* (2013.01); *G06F 3/061* (2013.01); *G06F 3/0661* (2013.01); *G06F 3/0679* (2013.01); *G06F 13/382* (2013.01); *G06F 3/067* (2013.01)

(58) Field of Classification Search
CPC .................................. G06F 3/067; G06F 3/061
See application file for complete search history.

(56) References Cited

U.S. PATENT DOCUMENTS

| 7,240,143 | B1 | 7/2007 | Scheffler et al. |
| 2010/0146186 | A1* | 6/2010 | Traister ............... G06F 12/0246 |
| | | | 711/103 |
| 2010/0174955 | A1 | 7/2010 | Carnevale et al. |
| 2012/0294315 | A1 | 11/2012 | Sukonik et al. |
| 2014/0344492 | A1* | 11/2014 | Patwa ..................... G06F 13/24 |
| | | | 710/269 |
| 2017/0046258 | A1* | 2/2017 | Watanabe ............... G06F 11/34 |

FOREIGN PATENT DOCUMENTS

| CN | 102782654 A | 11/2012 |
| TW | 201337573 A | 9/2013 |

* cited by examiner

*Primary Examiner* — Zachary K Huson
(74) *Attorney, Agent, or Firm* — McClure, Qualey & Rodack, LLP

(57) ABSTRACT

A data storage device with high efficiency, using a transport protocol core and a trigger machine. The transport protocol core is provided for the data storage device to communicate with a host. According to firmware of the data storage device, an operational schedule for the transport protocol core is pre-stored in the trigger machine. Instead of being triggered according to the firmware of the data storage device, the transport protocol core is triggered by the trigger machine to operate according to the operational schedule pre-stored in the trigger machine.

18 Claims, 4 Drawing Sheets

DATA STORAGE DEVICE AND OPERATING METHOD OF DATA STORAGE DEVICE

CROSS REFERENCE TO RELATED APPLICATIONS

This application claims the benefit of U.S. Provisional Application No. 62/453,565, filed on Feb. 2, 2017, the entirety of which is incorporated by reference herein.

This Application claims priority of Taiwan Patent Application No. 106121760, filed on Jun. 29, 2017, the entirety of which is incorporated by reference herein.

BACKGROUND OF THE INVENTION

Field of the Invention

The present invention relates to data storage devices.

Description of the Related Art

There are various forms of nonvolatile memory (NVM) used in data storage devices for long-term data retention, such as a flash memory, magnetoresistive RAM, ferroelectric RAM, resistive RAM, spin transfer torque-RAM (STT-RAM), and so on. How to improve the operational efficiency of data storage devices is an important issue in this technological field.

BRIEF SUMMARY OF THE INVENTION

A data storage device in accordance with an exemplary embodiment of the disclosure includes a transport protocol core and a trigger machine. The transport protocol core is provided for the data storage device to communicate with a host. According to firmware of the data storage device, an operational schedule for the transport protocol core is pre-stored in the trigger machine. Instead of being triggered according to the firmware of the data storage device, the transport protocol core is triggered by the trigger machine to operate according to the operational schedule pre-stored in the trigger machine.

In another exemplary embodiment of the disclosure, a method for operating a data storage device includes the following steps: providing a transport protocol core for the data storage device to communicate with a host; operating firmware of the data storage device to pre-store an operational schedule, for the transport protocol core, in a trigger machine; and using the trigger machine to replace the firmware of the data storage device to trigger the transport protocol core to operate according to the operational schedule pre-stored in the trigger machine.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention.

This description is made for the purpose of illustrating the general principles of the invention and should not be taken in a limiting sense. The scope of the invention is best determined by reference to the appended claims.

Figure 1:
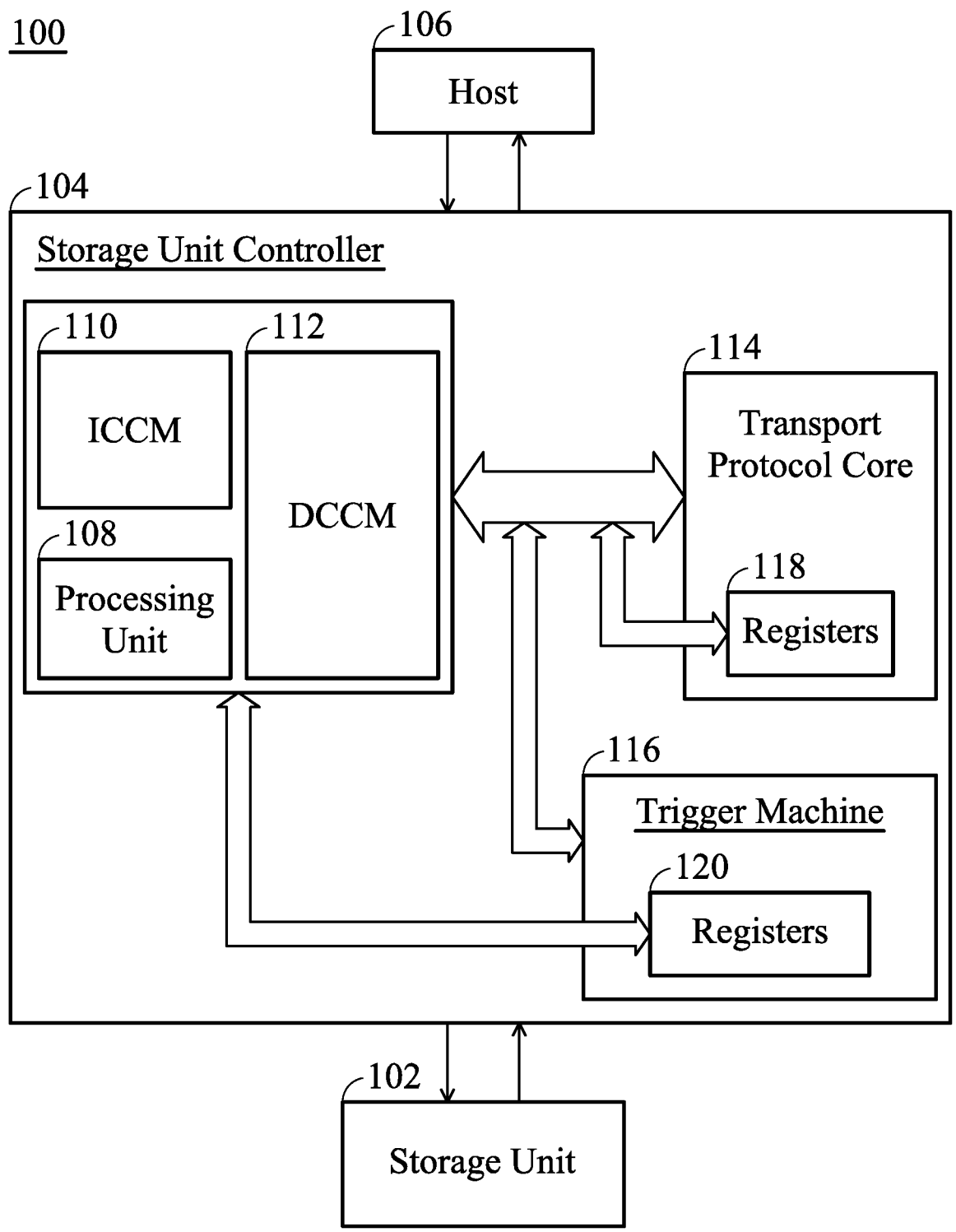
FIG. 1 is a block diagram depicting an electronic device 100 that is equipped with a data storage device including a storage unit 102 and a storage unit controller 104.

FIG. 1 is a block diagram depicting an electronic device 100 that is equipped with a data storage device including a storage unit 102 and a storage unit controller 104. The storage unit 102 is operated by the storage unit controller 104 to be accessed by a host 106.

The storage unit controller 104 includes a processing unit 108, a dynamic random access memory (DRAM, including an Instruction Close Coupled Memory (ICCM) 110 and a Data Close Coupled Memory (DCCM) 112), a transport protocol core 114 and a trigger machine 116. The transport protocol core 114 and the trigger machine 116 may be implemented by hardware or a combined hardware and software design.

The instructions in the ICCM 110 are executed by the processing unit 108. It is in this way that the firmware of the data storage device runs, and that the requests that have been issued by the host 106 are responded to. The DCCM 112 temporarily stores read/write data read from or to be written to the storage unit 102 and communication information for the data storage device to communicate to the host 106. The transport protocol core 114 of the data storage device is provided for data transmission between the storage unit controller 104 and host 106. Packages from the host 106 are unpacked by the transport protocol core 114 to be temporarily stored in the DCCM 112. The packing of data and information accessed from the DCCM 112 is also performed by the transport protocol core 114 of the data storage device and the packages are transmitted to the host 106 by the transport protocol core 114 of the data storage device. The transport protocol core 114 of the data storage device is triggered by the trigger machine 116 to perform tasks. The tasks to be done by the transport protocol core 114 of the data storage device are scheduled by the firmware of the data storage device. After the operational schedule for the transport protocol core 114 is generated by the firmware of the data storage device, the trigger machine 116 takes over the full responsibility of triggering the transport protocol core 114 of the data storage device to follow the operational schedule. In this manner, when the transport protocol core 114 is triggered to follow the operational schedule, the firmware of the data storage device is not occupied in operating the transport protocol core 114 and is available for other tasks.

As shown in FIG. 1, the transport protocol core 114 of the data storage device includes registers 118, and there are registers 120 in the trigger machine 116. The transport protocol core 114 of the data storage device operates according to the information obtained from the registers 118. In the disclosure, instead of being directly written by the running firmware of the data storage device, the registers 118 are written by the trigger machine 116. In an exemplary embodiment, the registers 120 may store N patches of status information for the registers 118. After writing the registers 120 within the trigger machine 116 to list the operational schedule for the transport protocol core 114 of the data storage device, the firmware of the data storage device no longer involves the operations of the transport protocol core 114 of the data storage device. The trigger machine 116 takes over to update the registers 118 within the transport protocol core 114 of the data storage device according to the operational schedule listed in the registers 120. According to the changes the trigger machine 116 makes to the registers 120, the transport protocol core 114 of the data storage device follows the operational schedule. The registers 118 and 120 may be replaced by other types of storage components.

In an exemplary embodiment, the storage unit 102 may be a flash memory. The transport protocol core 114 may be provided for implementation of a universal flash storage (UFS) and is known as a UTP (UFS transport protocol) core. The storage unit 102 and the storage unit controller 104 may be combined to form a UFS, which uses a flash memory to form an embedded or external data storage device for the electronic device 100. The electronic device 100 may be a smartphone, a wearable device, a tablet computer, a virtual reality device, etc. A central processing unit (CPU) in the electronic device 100 may be regarded as the host 106.

In the following discussion, how to read/write the storage unit 102 by the storage unit controller 104 is shown.

Figure 2:
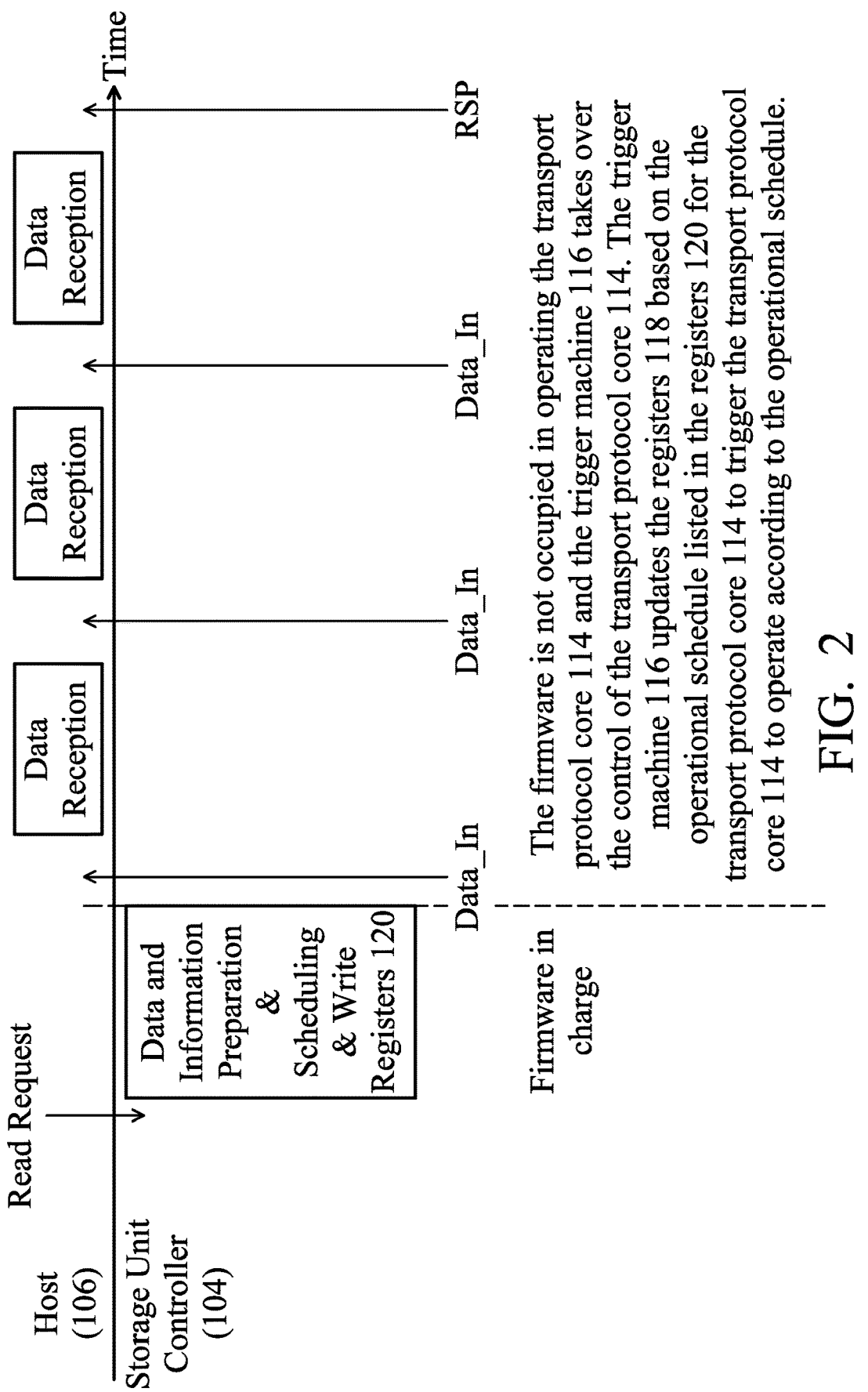
FIG. 2 is a timing diagram illustrating the interactions between the host 106 and the storage unit controller 104 when the host 106 issues a read request.

FIG. 2 is a timing diagram illustrating the interactions between the host 106 and the storage unit controller 104 when the host 106 issues a read request. As shown, the firmware only participates in the early stage and, in the later stage, the firmware is free and available for other tasks.

In the early stage, according to the running firmware, the storage unit 102 is accessed, read data retrieved from the storage unit 102 is temporarily stored in the DCCM 112, communication information operative to indicate the end of data transmission is prepared in the DCCM 112, the tasks to be done by the transport protocol core 114 of the data storage device are scheduled, and the established operational schedule is listed in the registers 120 within the trigger machine 116.

In the later stage, the firmware is not occupied in operating the transport protocol core 114 and the trigger machine 116 takes over the control of the transport protocol core 114. The trigger machine 116 updates the registers 118 within the transport protocol core 114 based on the operational schedule listed in the registers 120 for the transport protocol core 114. The transport protocol core 114 of the data storage device operates according to the changing registers 118. According to the exemplary embodiment of FIG. 2, the trigger machine 116 triggers the transport protocol core 114 of the data storage device to transmit three read data packages Data_In (data-in packages such as "Data IN UPIU" packages) and then transmit an ending package RSP (an RSP package such as a "Response UPIU" package) to inform the host 106 of the completed read request. The generation and transmission of each read data package Data_In is discussed here. The transport protocol core 114 of the data storage device gets one sector of read data from the DCCM 112, packs the sector of read data to form one read data package Data_In, and transmits the read data package Data_In to the host 106. The generation and transmission of the ending package RSP is also discussed. From the DCCM 112, the transport protocol core 114 of the data storage device gets and packs the related content to form an ending package RSP and transmits the generated ending package RSP to the host 106. When transmitting three read data packages Data_IN plus one ending package RSP, the transport protocol core 114 of the data storage device is not driven by the running firmware. Instead, the transport protocol core 114 of the data storage device is triggered by the trigger machine 116 to perform the series of events. The trigger machine 116 updates the registers 118 based on the operational schedule pre-stored in the registers 120. In the later stage, the firmware is free and is available for other tasks. The operational efficiency of the data storage device, therefore, is dramatically improved.

Figure 3:
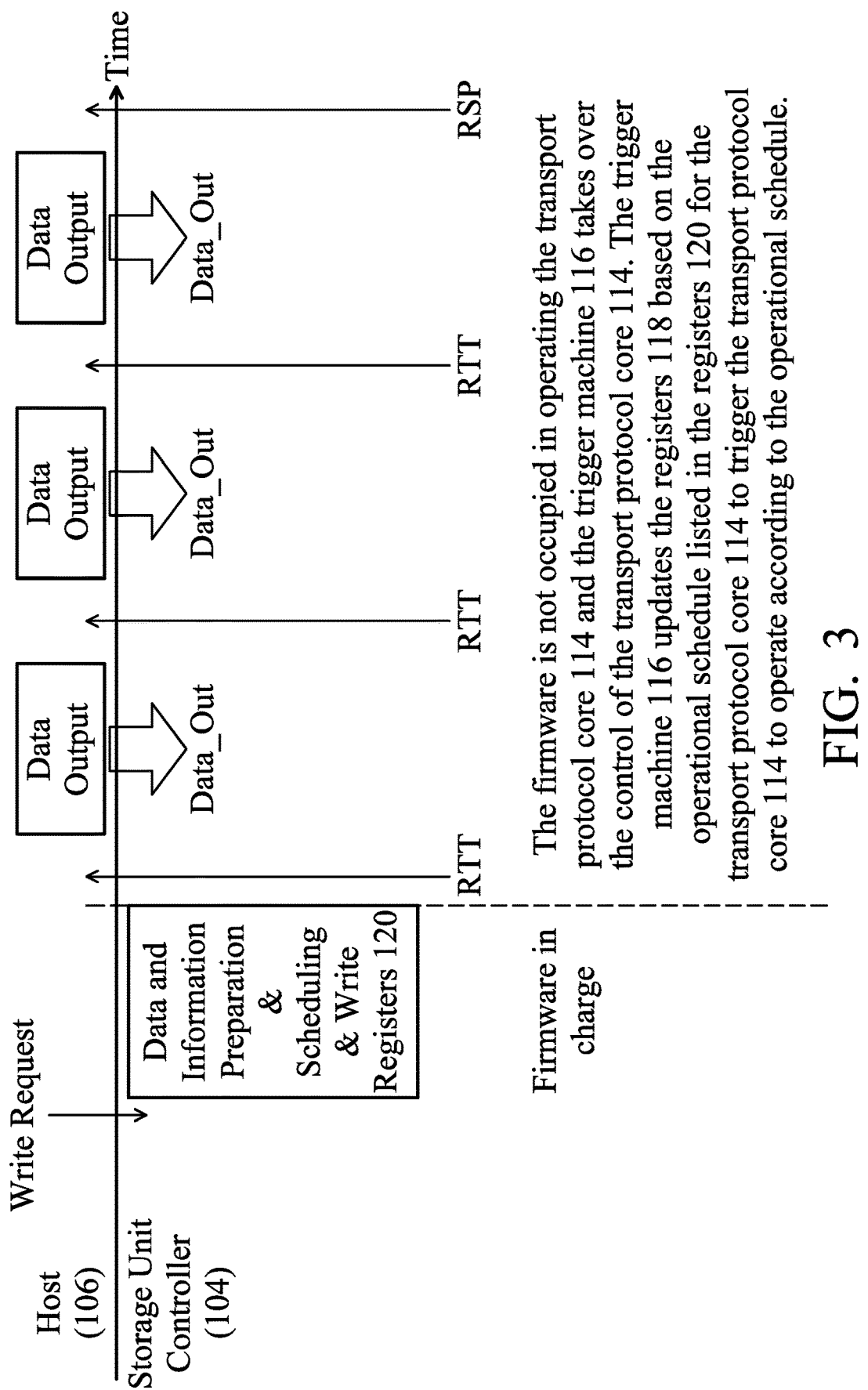
FIG. 3 is a timing diagram illustrating the interactions between the host 106 and the storage unit controller 104 when the host 106 issues a write request.

FIG. 3 is a timing diagram illustrating the interactions between the host 106 and the storage unit controller 104 when the host 106 issues a write request. As shown, the firmware only participates in the early stage and, in the later stage, the firmware is free and available for other tasks.

In the early stage, according to the running firmware, communication information operative to indicate a readiness to receive write data and communication information operative to indicate the end of data transmission are prepared in the DCCM 112, the tasks to be done by the transport protocol core 114 of the data storage device are scheduled, and the established operational schedule is listed in the registers 120 within the trigger machine 116.

In the later stage, the firmware is free and the trigger machine 116 takes over the control of the transport protocol core 114 of the data storage device. The trigger machine 116 updates the registers 118 within the transport protocol core 114 of the data storage device based on the operational schedule listed by the registers 120. The transport protocol core 114 of the data storage device changes operations according to the changing registers 118. According to the exemplary embodiment of FIG. 3, the trigger machine 116 triggers the transport protocol core 114 of the data storage device to transmit a forecast package RTT (e.g. a "Ready to Transfer UPIU" package) three times. As shown, each forecast package RTT is answered by a write data packages Data_Out (e.g. a "Data OUT UPIU" package). Then, the trigger machine 116 triggers the transport protocol core 114 of the data storage device to transmit an ending package RSP (an RSP package such as a "Response UPIU" package) to inform the host 106 of the completed write request. The generation and transmission of each forecast package RTT is discussed here. From the DCCM 112, the transport protocol core 114 of the data storage device gets and packs the related content to form a forecast package RTT and transmits the forecast package RTT to the host 106. The reception of each write data package Data_Out is discussed here. The transport protocol core 114 of the data storage device unpacks the received write data package Data_Out and temporarily stores the unpacked write data in the DCCM 112 to be collected and written to the storage unit 102. The generation and transmission of the ending package RSP is also discussed. From the DCCM 112, the transport protocol core 114 of the data storage device gets and packs the related content to form an ending package RSP (an RSP package such as a "Response UPIU" package) to be transmitted to the host 106. When performing a series of events, including "transmission of one forecast package RTT"→"reception of one write data package Data_Out"→"transmission of one forecast package RTT"→"reception of one write data package Data_Out"→"transmission of one forecast package RTT"→"reception of one write data package Data_Out"→"transmission of one ending package RSP", the transport protocol core 114 of the data storage device is not driven by the running firmware. Instead, the transport protocol core 114 of the data storage device is triggered by the trigger machine 116 to perform the series of events. The trigger machine 116 updates the registers 118 based on the operational schedule pre-stored in the registers 120. In the later stage, the firmware is free and is available for other tasks. The operational efficiency of the data storage device, therefore, is dramatically improved.

Figure 4:
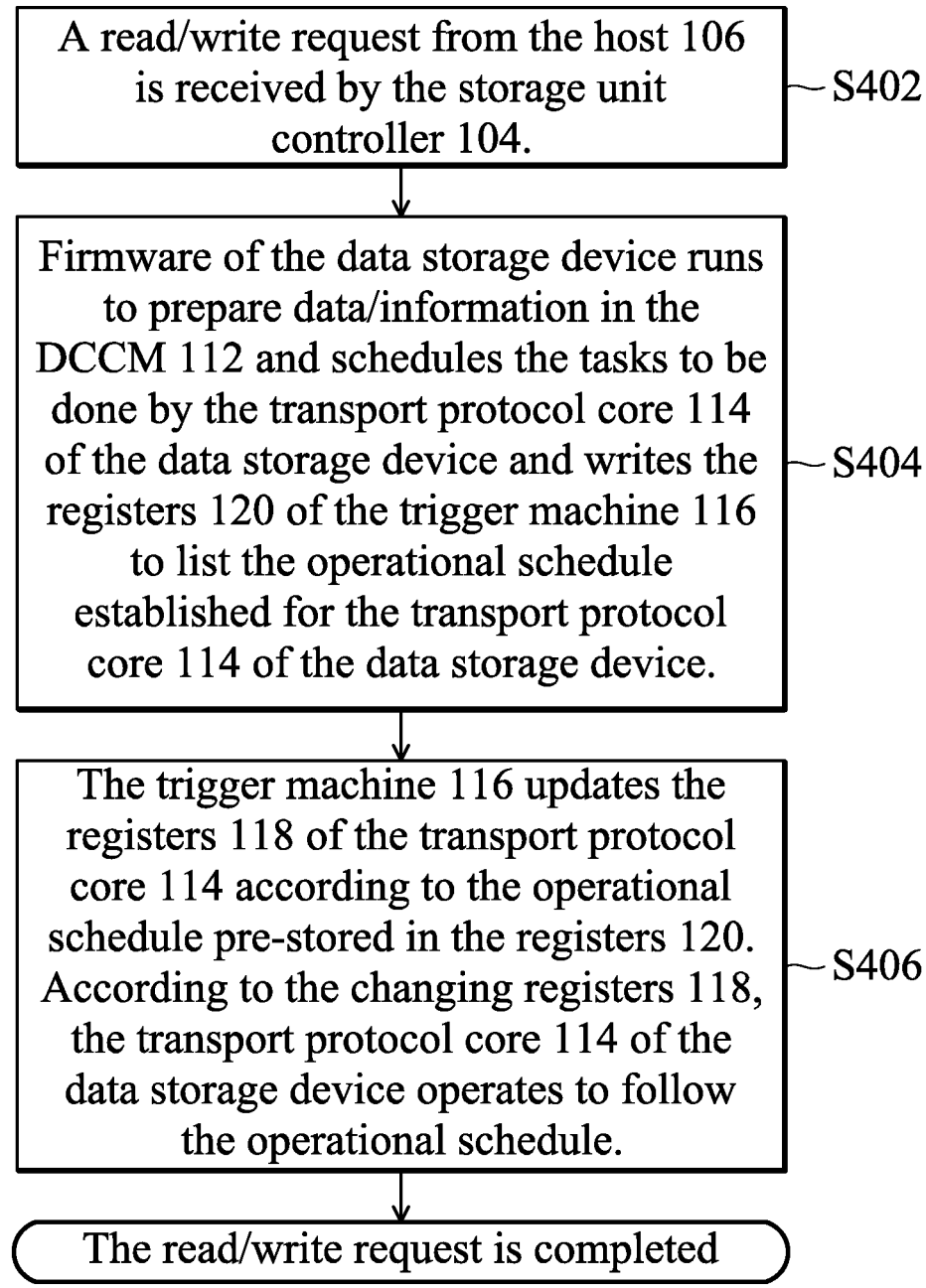
FIG. 4 is a flowchart depicting how the storage unit controller 104 responds to the read/write requests from the host 106 in accordance with an exemplary embodiment of the DISCLOSURE.

FIG. 4 is a flowchart depicting how the storage unit controller 104 responds to the read/write requests from the host 106 in accordance with an exemplary embodiment of the disclosure. In step S402, a read/write request from the host 106 is received by the storage unit controller 104. In step S404, firmware of the data storage device runs to prepare data/information in the DCCM 112 and schedules the tasks to be done by the transport protocol core 114 of the data storage device and writes the registers 120 of the trigger machine 116 to list the operational schedule established for the transport protocol core 114 of the data storage device. In step S406, the trigger machine 116 updates the registers 118 of the transport protocol core 114 according to the operational schedule pre-stored in the registers 120. According to the changing registers 118, the transport protocol core 114 of the data storage device operates to follow the operational schedule. The read/write request, therefore, is completed.

Other techniques that use the aforementioned concepts to improve the operational efficiency of data storage device are within the scope of the disclosure. Based on the above contents, the present invention further relates to methods for operating a data storage device.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a transport protocol core for the data storage device to communicate with a host; and
a trigger machine, operative to pre-store an operational schedule for the transport protocol core,
wherein:
the operational schedule is built by firmware of the data storage device based on tasks to be done by the transport protocol core and is pre-stored in the trigger machine by the firmware of the data storage device;
the trigger machine triggers the transport protocol core to operate according to the operational schedule pre-stored in the trigger machine; and
when the transport protocol core operates as triggered by the trigger machine, the firmware of the data storage device is not occupied in operating the transport protocol core and is available for other tasks.

2. The data storage device as claimed in claim 1, wherein:
a first storage space is built in the transport protocol core and the transport protocol core operates according to information obtained from the first storage space; and
the trigger machine updates the first storage space based on the operational schedule pre-stored in the trigger machine and thereby the transport protocol core follows the operational schedule.

3. The data storage device as claimed in claim 2, wherein:
a second storage space is built in the trigger machine to list the operational schedule; and the trigger machine updates the first storage space of the transport protocol core based on the operational schedule listed in the second storage space to trigger the transport protocol core to follow the operational schedule.

4. The data storage device as claimed in claim 3, wherein:
the second storage space is filled by the firmware of the data storage device.

5. The data storage device as claimed in claim 4, wherein:
when the trigger machine updates the first storage space of the transport protocol core based on the operational schedule listed in the second storage space, the firmware of the data storage device is not occupied in operating the transport protocol core and is available for other tasks.

6. The data storage device as claimed in claim 1, further comprising:
a storage unit; and
a dynamic random access memory,
wherein:
when the host issues a read request to the data storage device, the firmware of the data storage device builds the operational schedule based on tasks to be done by the transport protocol core, pre-stores the operational schedule in the trigger machine, accesses the storage unit for read data, temporarily stores the read data in the dynamic random access memory, and prepares communication information operative to indicate an end of data transmission in the dynamic random access memory.

7. The data storage device as claimed in claim 6, wherein:
the transport protocol core is triggered by the trigger machine to read the dynamic access memory to get and pack the read data as read data packages, and to transmit the read data packages to the host; and
the transport protocol core is further triggered by the trigger machine to read the dynamic access memory to get and pack the communication information as an ending package, and transmit the ending package to inform the host of the completed read request.

8. The data storage device as claimed in claim 1, further comprising:
a storage unit; and
a dynamic random access memory,
wherein:
when the host issues a write request to the data storage device, the firmware of the data storage device builds the operational schedule based on tasks to be done by the transport protocol core, pre-stores the operational schedule in the trigger machine, and prepares communication information operative to indicate a readiness to receive write data and communication information operative to indicate an end of data transmission in the dynamic random access memory.

9. The data storage device as claimed in claim 8, wherein:
the transport protocol core is triggered by the trigger machine to read the dynamic access memory to get and pack the communication information operative to indicate ready for write data reception as forecast data packages, and transmit the forecast data packages to the host;
after transmitting one forecast data package to the host, the transport protocol core is further triggered by the trigger machine to temporarily store write data in the dynamic random access memory to be collected in the storage unit; and the transport protocol core is further triggered by the trigger machine to read the dynamic access memory to get and pack the communication information operative to indicate the end of the data transmission as an ending package, and to transmit the ending package to inform the host of the completed write request.

10. A method for operating a data storage device, comprising:
providing a transport protocol core for the data storage device to communicate with a host;
operating firmware of the data storage device to build an operational schedule based on tasks to be done by the transport protocol core and pre-store the operational schedule in a trigger machine; and
using the trigger machine to trigger the transport protocol core to operate according to the operational schedule pre-stored in the trigger machine,
wherein when the transport protocol core operates as triggered by the trigger machine, the firmware of the data storage device is not occupied in operating the transport protocol core and is available for other tasks.

11. The method as claimed in claim 10, further comprising:
providing a first storage space in the transport protocol core,
wherein:
the transport protocol core operates according to information obtained from the first storage space; and
the trigger machine updates the first storage space based on the operational schedule pre-stored in the trigger machine and thereby the transport protocol core follows the operational schedule.

12. The method as claimed in claim 11, further comprising:
providing a second storage space in the trigger machine to list the operational schedule,
wherein the trigger machine updates the first storage space of the transport protocol core based on the operational schedule listed in the second storage space to trigger the transport protocol core to follow the operational schedule.

13. The method as claimed in claim 12, wherein:
the second storage space is filled by the firmware of the data storage device.

14. The method as claimed in claim 13, wherein:
when the trigger machine updates the first storage space of the transport protocol core based on the operational schedule listed in the second storage space, the firmware of the data storage device is not occupied in operating the transport protocol core and is available for other tasks.

15. The method as claimed in claim 10, wherein:
when the host issues a read request to the data storage device, the firmware of the data storage device builds the operational schedule based on tasks to be done by the transport protocol core, pre-stores the operational schedule in the trigger machine, accesses a storage unit of the data storage device for read data, temporarily stores the read data in a dynamic random access memory of the data storage device, and prepares communication information operative to indicate an end of data transmission in the dynamic random access memory.

16. The method as claimed in claim 15, wherein:
the transport protocol core is triggered by the trigger machine to read the dynamic access memory to get and pack the read data as read data packages, and transmit the read data packages to the host; and
the transport protocol core is further triggered by the trigger machine to read the dynamic access memory to get and pack the communication information as an ending package, and transmit the ending package to inform the host of the completed read request.

17. The method as claimed in claim 10, wherein:
when the host issues a write request to the data storage device, the firmware of the data storage device builds the operational schedule based on tasks to be done by the transport protocol core, pre-stores the operational schedule in the trigger machine, and prepares communication information operative to indicate a readiness to receive write data and communication information operative to indicate an end of data transmission in a dynamic random access memory of the data storage device.

18. The method as claimed in claim 17, wherein:
the transport protocol core is triggered by the trigger machine to read the dynamic access memory to get and pack the communication information operative to indicate a readiness to receive write data as forecast data packages, and to transmit the forecast data packages to the host;
after transmitting one forecast data package to the host, the transport protocol core is further triggered by the trigger machine to temporarily store write data in the dynamic random access memory to be collected in a storage unit of the data storage device; and
the transport protocol core is further triggered by the trigger machine to read the dynamic access memory to get and pack the communication information operative to indicate the end of the data transmission as an ending package, and transmit the ending package to inform the host of the completed write request.

* * * * *